US012573565B1

(12) United States Patent
Tahir et al.

(10) Patent No.: US 12,573,565 B1
(45) Date of Patent: Mar. 10, 2026

(54) CALF-20 METAL-ORGANIC FRAMEWORK FOR SUPERCAPACITOR APPLICATION

(71) Applicant: United Arab Emirates University, Al Ain (AE)

(72) Inventors: Muhammad Tahir, Al Ain (AE); Rabbia Naz, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/195,917

(22) Filed: May 1, 2025

(51) Int. Cl.
*H01G 11/38* (2013.01)
*C07F 3/06* (2006.01)
*H01G 11/34* (2013.01)

(52) U.S. Cl.
CPC ............... *H01G 11/38* (2013.01); *C07F 3/06* (2013.01); *H01G 11/34* (2013.01)

(58) Field of Classification Search
CPC ......... H01G 11/34; H01G 11/46; H01G 11/38
See application file for complete search history.

(56) References Cited

U.S. PATENT DOCUMENTS

| | | | |
|---|---|---|---|
| 2016/0016148 A1 | 1/2016 | Shimizu et al. | |
| 2021/0065997 A1* | 3/2021 | Yang ........................ | H01B 1/06 |
| 2023/0317918 A1* | 10/2023 | Xu ........................ | H01M 4/136 |
| | | | 429/209 |

FOREIGN PATENT DOCUMENTS

| | | | | |
|---|---|---|---|---|
| CN | 108163936 A | * | 6/2018 | ........... G01N 27/416 |
| CN | 116631784 A | * | 8/2023 | ............. H01G 11/46 |
| CN | 118039371 A | * | 5/2024 | ............. H01G 11/56 |
| KR | 102487821 B1 | * | 1/2023 | ............. H01B 13/00 |
| WO | 2019204934 A1 | | 10/2019 | |

OTHER PUBLICATIONS

Zhang et al, Scalable MOF-based mixed matrix membranes with enhanced permeation processes facilitate the scale application of membrane-based carbon capture technologies, Carbon Capture Science & Technology 13 (2024) 100276, https://doi.org/10.1016/j.ccst.2024.100276 (Year: 2024).*

Ozin, "CALF-20: A carbon capture success story", ASN Weekly—Environment, Jan. 14, 2022, 11 pages.

Pereira et al., "Enhancing CO2 Capture Via Fast Microwave-Assisted Synthesis of the CALF-20 Metal—Organic Framework", Inorganic Chemistry, Feb. 7, 2025, vol. 64, Issue 7, 10 pages.

Nolly et al., "Pseudocapacitive Effects of Multi-Walled Carbon Nanotubes-Functionalised Spinel Copper Manganese Oxide", Nanomaterials, 2022, vol. 12, 21 pages.

Forouzandeh et al., "Two-dimensional (2D) electrode materials for supercapacitors", Materials Today, Proceedings 41, 2021, pp. 498-505.

* cited by examiner

*Primary Examiner* — David M Sinclair

(74) *Attorney, Agent, or Firm* — MH2 Technology Law Group, LLP

(57) ABSTRACT

The present invention provides metal-organic frameworks (MOFs) as electrode materials. More particularly, the present invention provides an electrode comprising MOF for use in electrochemical energy storage systems. Again, the present invention provides a method of preparing MOF comprising Calf-20 and a method of preparing the electrode comprising the MOF. Additionally, the present invention provides an electrode functioning as a supercapacitor.

8 Claims, 6 Drawing Sheets

CALF-20 METAL-ORGANIC FRAMEWORK FOR SUPERCAPACITOR APPLICATION

FIELD OF THE INVENTION

The present invention relates to metal-organic frameworks (MOFs) as electrode materials. More particularly, the present invention relates to an electrode comprising MOF for use in electrochemical energy storage systems. Further, the present invention relates to a method of preparing MOF comprising Calf-20 and a method of preparing the electrode comprising the MOF.

BACKGROUND OF THE INVENTION

Metal organic frameworks (MOFs) serve as an important component for the electrode material development in energy storage devices. In this regard, flexible MOFs have emerged as soft, porous, or dynamic structures that can comprehend the conventional challenges in the rigidity and fragility in traditional MOFs. The use of conventional MOFs has been limited due to their intriguing mechanical and thermal properties. Therefore, flexible MOFs with better thermal and mechanical properties can widen the areas of applications as well as the commercial usage of such materials.

One of such flexible MOFs is Calgary Framework (Calf-20) that has been proposed as an efficient gas absorbent for $CO_2$ capture applications. Moreover, Calf-20 structure has been explored for the applications of gas storage, catalysis, separation of gas mixtures and many more. Calf-20 is mainly composed of zinc metal ions or clusters with an organic linker that is specifically 1, 2, 4-triazole in this framework. In this framework, 1, 2, 4-triazole is present in 2D layer forms which are combined to form a 3D structure using Zinc ions/clusters and oxalate linkages. This interesting framework has been explored for various applications such as separation of $N_2$ and $CO_2$ gases, $CO_2$ capture, $CO_2$ adsorption, $CO_2$ and $H_2O$ diffusion, and etc. The applicability of Calf-20 in these applications is a proof that it can be used as porous structure for various applications. However, to date, there is no such study claiming the use of Calf-20 for electrochemical energy storage applications. The use of metal-organic frameworks (MOFs) as electrode materials in electrochemical energy storage systems has recently gained interest owing to their characteristic porous structure with tuneable properties. However, as a medium for energy storage, its potential has not been explored yet.

The use of Calf-20 for energy storage applications is motivated by its scalability for commercial applications, reported the scalable production of Calf-20 for temperature swing adsorption of 1 ton $CO_2$ removal from flue gas of cement. Previous publications disclose spinel copper manganese oxide nanoparticles combined with acid-treated multi-walled carbon nanotubes ($CuMn_2O_4$/MWCNTs) that were used in the development of electrodes for pseudo-capacitor applications. Again, another publication reports synthesize of Calf-20 rapidly in a $H_2O$/methanol solution at room temperature and normal pressure using zinc acetate as a metal source, sodium oxalate and 1,2,4-triazole organic ligands, and a low concentration of a $H_2O$/methanol solution.

Given the wide application of Calf-20 and its porous structure, there remains an unmet need for further utilization of Calf-20 in electrochemical energy storage devices such as supercapacitors and batteries facilitating scalable production for commercial application. Hence, inspired by the porous network of Calf-20 and its excellent capability to work for gas adsorption techniques, there is a need for the development of electrodes for supercapacitor application comprising MOFs (Calf-20) and further provide simple methods for the preparation of MOFs (Calf-20).

OBJECTIVES OF THE INVENTION

The main objective of the present invention is to provide an electrode comprising a flexible metal-organic framework (MOF) comprising Calf-20 as the electrode material.

Another objective of the present invention is to provide an electrode functioning as a supercapacitor.

Another objective of the present invention is to provide a process for preparing a flexible metal-organic framework (MOF) comprising a Calgary Framework (Calf-20).

Another objective of the present invention is to provide a process for preparing an MOF starting from zinc oxalate hydrate and 1,2,4-triazole.

Another objective of the present invention is to provide a simple method for preparing MOF.

Yet another objective of the present invention is to provide a process of preparing the electrode by depositing a slurry comprising MOF on a substrate.

SUMMARY OF THE INVENTION

This summary provides a simplified introduction to the present invention detailed in the following Detailed Description. It aims to present an overview of the subject matter without identifying key or essential features of the claimed invention or aiding in the determination of its scope:

Accordingly, the present invention provides an electrode comprising an activated material, activated carbon, a binder, and a substrate, wherein the activated material is a flexible metal organic framework (MOF) comprising a Calgary Framework (Calf-20).

Further, the present invention provides a process of preparing a flexible metal-organic framework (MOF) comprising a Calgary Framework (Calf-20), wherein the process comprises:

a) dissolving zinc oxalate hydrate in a solvent under stirring for about 5 minutes to 10 minutes to obtain a solution, b) adding 1, 2, 4-triazole to the solution to obtain a homogenous suspension, c) transferring the homogenous suspension into an autoclave and heating at a temperature ranging from 150° C. to 200° C., d) allowing the autoclave to cool to room temperature to obtain a crude precipitate, and e) washing the crude precipitate followed by drying at a temperature ranging from 50° C.-100° C. to obtain the MOF.

The present invention further provides a process for preparing an electrode, wherein the process comprises:

a) preparing a slurry by mixing an activated material, activated carbon, and a binder in a solvent to obtain a mixture, b) grinding the mixture to obtain a homogenous slurry, and c) coating the slurry uniformly on a substrate followed by drying at a temperature ranging from 50° C.-100° C. to obtain the electrode.

BRIEF DESCRIPTION OF DRAWINGS OF THE INVENTION

The drawings described herein are for illustrative purposes only of selected embodiments and not all possible implementations and are not intended to limit the scope of the present disclosure.

Further objectives and advantages of this invention will be more apparent from the ensuing description when read in conjunction with the accompanying drawing and wherein.

Figure 4:
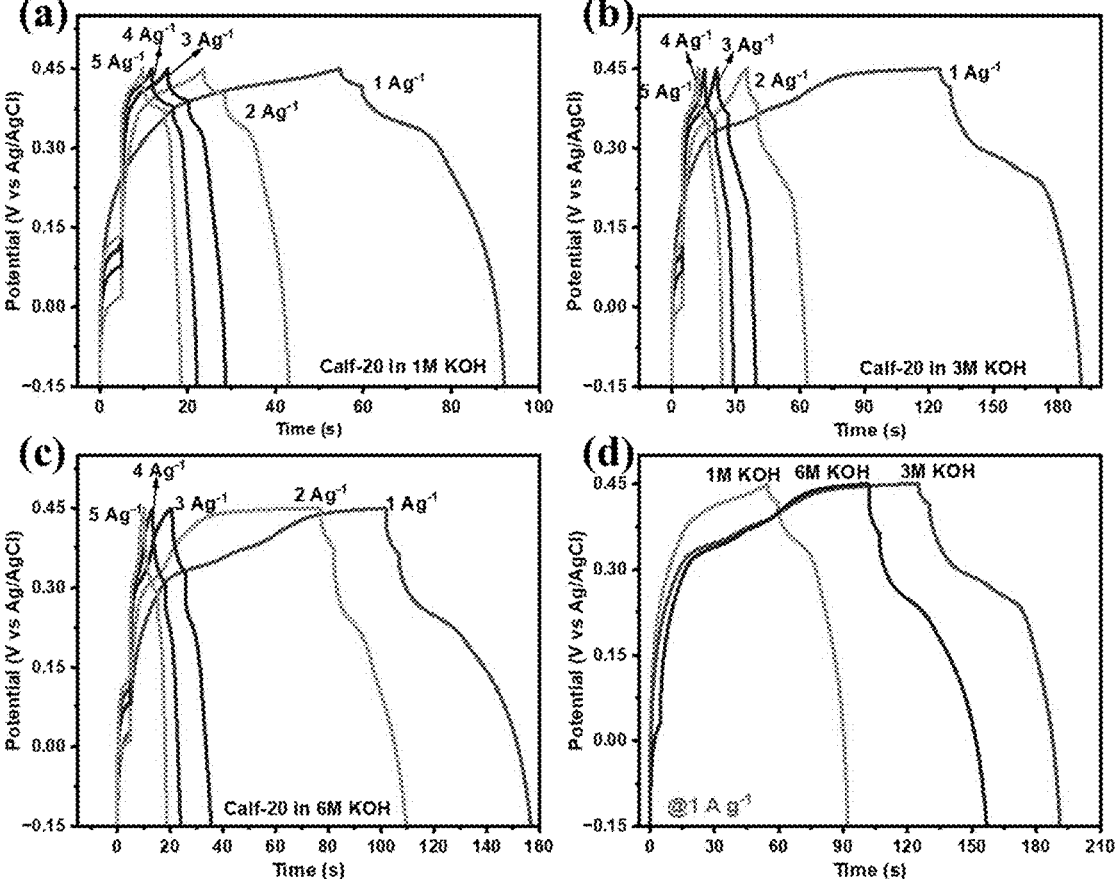
Figure 5:
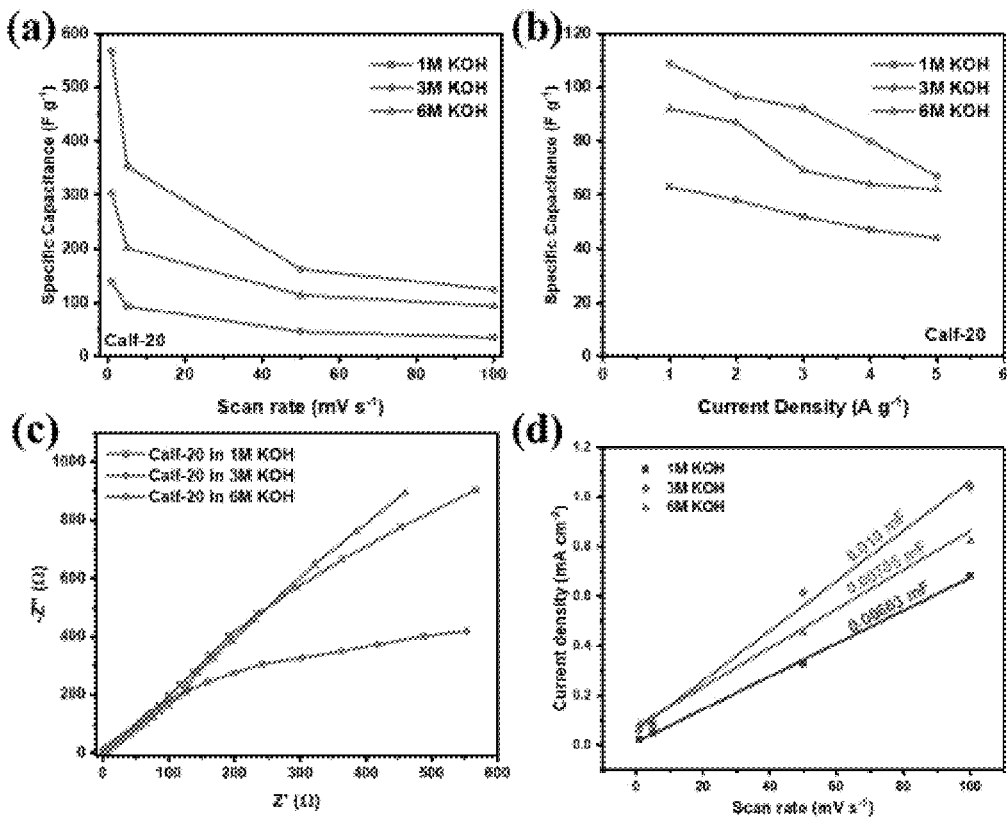

FIG. 4 illustrates GCD curves of Calf-20 in (a) 1M KOH, (b) 3M KOH, (c) 6M KOH, and (d) comparison of CV curves at 1 Ag$^{-1}$ for three electrolytes FIG. 5 illustrates Comparison of specific capacitance with (a) scan rate in mVs$^{-1}$, (b) current density in Ag$^{-1}$, (c) electrochemical impedance spectroscopy Nquist plots, and (d) slope of scan rate vs current density to find electrochemical active surface area.

Figure 6:
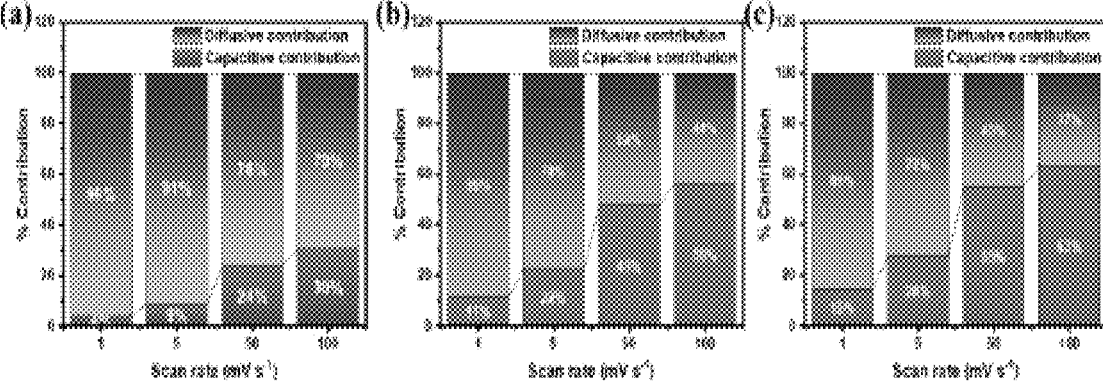

FIG. 6 illustrates Diffusive and capacitive contributions of Calf-20 CV curves in (a) 1M KOH, (b) 3M KOH and (c) 6M KOH.

Figure 7:
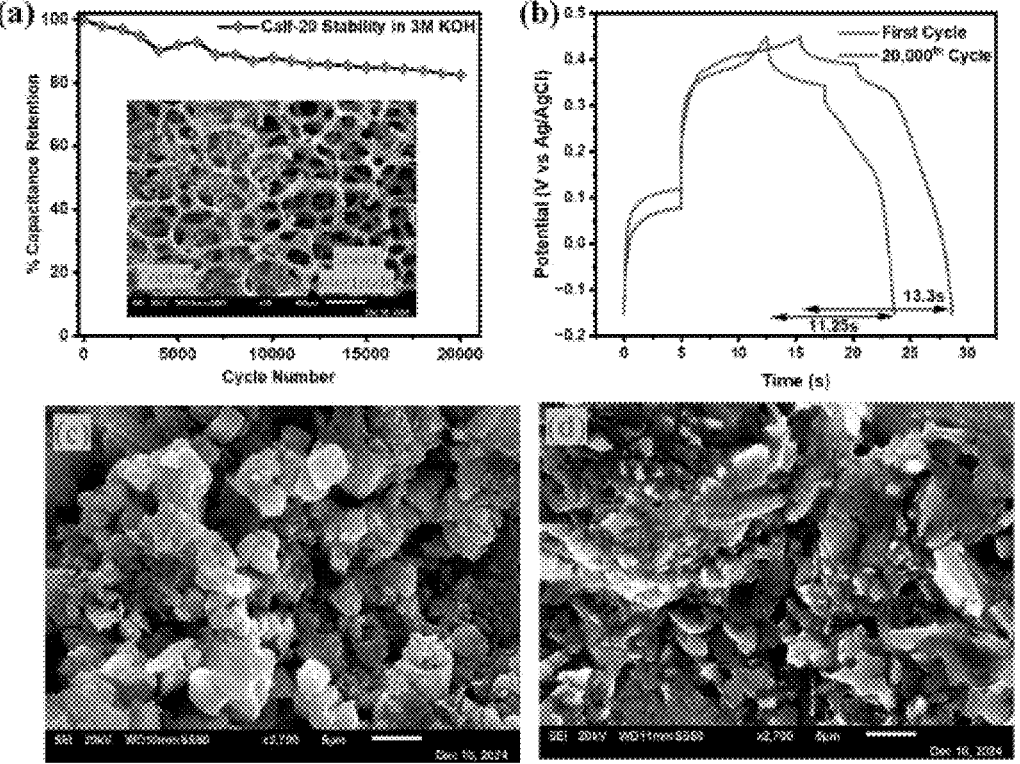

FIG. 7 illustrates (a) Cyclic stability of Calf-20 in 3M KOH electrolyte, (b) Comparison of 1st and last GCD cycle of cyclic stability. (c) SEM image of Calf-20 slurry coated nickel foam, and (d) SEM image of Calf-20 slurry coated nickel foam after 20,000 cycles

DETAILED DESCRIPTION OF THE INVENTION

At the very outset of the detailed description, it may be understood that the ensuing description only illustrates a particular form of this invention. However, such a particular form is only exemplary embodiment, and without intending to imply any limitation on the scope of this invention. Accordingly, the description is to be understood as an exemplary embodiment and teaching of invention and not intended to be taken restrictively.

It is also to be understood that the terminology used herein is for the purpose of describing particular embodiments only and is not intended to limit the present disclosure.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range. Where the stated range includes one or both of the limits, ranges excluding either or both of those included limits are also included in the methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number. In an embodiment, "about" can mean within one or more standard deviations, or within ±30%, 25%, 20%, 15%, 10% or 5% of the stated value.

"Room temperature" wherever mentioned is the temperature which is in the range of 20° C. to 30° C.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described.

The present invention provides a process for synthesis of a metal-organic framework (MOF) comprising Calf-20 for use as an electrode material for supercapacitor applications. The process provides a simple solvothermal methodology in methanol for easy preparation of Calf-20. The structure and morphology of Calf-20 has been studied using XRD, FTIR, and Raman spectra followed by the morphological characterization using SEM images and EDX mapping. Further, the present invention provides an electrode comprising a slurry of Calf-20 deposited on a substrate and the electrode thus obtained is subjected to CV (Cyclic voltammetry), GCD (galvanostatic charge/discharge), and EIS (electrochemical impedance spectroscopy). Three different potassium hydroxide concentrations are selected to analyse the specific capacitance properties of Calf-20 electrode, and it provided highest specific capacitance in the 3M KOH concentration with a reasonable cyclic stability.

Accordingly, the present invention provides an electrode comprising an activated material, activated carbon, a binder, and a substrate, wherein the activated material is a flexible metal organic framework (MOF) comprising a Calgary Framework (Calf-20).

In an embodiment of the present invention, the activate material, the activated carbon, and the binder are present in a ratio of 8:1.5:0.5. However, the ratio may be varied ranging from 7 to 9 for active material, 1-1.5 for activated carbon, and 0.5 to 1 for the binder. To test the electrochemical performance of a material, the ratio of active material (sample), activated carbon (AC), and a binder is set to be optimum. It is because the deposition and drying of slurry on the substrate should be uniform that depends on this ratio. Minimum binder amount should be used as it hinders the overall ionic conductivity however, the amount should not be so less to dissolve the slurry upon electrolyte interaction. Thus, the binder ratio is kept ranging from 0.5 to 1. Considering activated carbon, the amount should not be too high that it incorporates the performance of AC instead of our actual sample. So, the maximum amount of 1 to 1.5 ratio is used.

In an embodiment of the present invention, the binder is selected from Polyvinylidene fluoride (PVDF). In a preferred embodiment, the binder is PVDF. Other binders such as PTFE and Nafion can also be used for making the slurry. Considering binders, different materials have been used in the past-however, a balance between cost, handling and performance is to be achieved. For example, Nafion binder is highly conductive and offers minimum resistance, but its cost is very high. Considering polytetrafluoroethylene (PTFE), the handling is difficult as it needs moisture-free environments for storage and should not come in contact with air as well. Therefore, PVDF is selected as a binder for this study providing better conductivity at reasonable cost and handling.

In an embodiment of the present invention, the substrate is selected from nickel foam. In a preferred embodiment, the substrate is Nickel foam. Other substrates such as FTO glass, carbon cloth, glassy carbon, and copper foam can also be utilized for the electrochemical testing of CALF-20. In the present invention, nickel foam is used as a substrate due to ease of preparation and deposition of slurry. Moreover, nickel foam itself is an excellent conductor, that results in minimum hindrance to charge transfer through the actual sample. Other substrates like glassy carbon and carbon cloth are also available. However, glassy carbon poses a higher resistance and carbon cloth has very high conductivity but is expensive and preferred for flexible devices.

In an embodiment of the present invention, the electrode is a supercapacitor.

In an embodiment of the present invention, the MOF maintains a porous structure up to about 350° C. and has an overall distribution of different micro-sized particles ranging from about 1 to 3 μm or preferably from 0.5 to 5 μm.

In an embodiment of the present invention, the electrode has a capacitance retention of about 80% to 90% after about 15000 to 25000 cycles at a current density ranging from 15 to 25 $Ag^{-1}$.

Further, the present invention provides a process of preparing a flexible metal-organic framework (MOF) comprising a Calgary Framework (Calf-20), wherein the process comprises:

a) dissolving zinc oxalate hydrate in a solvent under stirring for about 5 minutes to 10 minutes to obtain a solution,
 b) adding 1, 2, 4-triazole to the solution to obtain a homogenous suspension,
 c) transferring the homogenous suspension into an autoclave and heating at a temperature ranging from 150° C. to 200° C.,
 d) allowing the autoclave to cool to room temperature to obtain a crude precipitate, and e) washing the crude precipitate followed by drying at a temperature ranging from 50° C.-100° C. to obtain the MOF.

In a preferred embodiment of the present invention, the stirring in step (a) is done for 5 minutes and the temperature in step (c) is 180° C.

In an embodiment of the present invention, the solvent in step (a) is selected from methanol. In a preferred embodiment, the solvent is methanol. CALF-20 may be made using different solvents like methanol or DI water. However, the choice and amount of solvent depicts the morphology of resulting material. Previous studies showed the ratio of methanol and water being used resulting in different morphology for each ratio while if only DI water is used, there was no product formed.

In an embodiment of the present invention, the heating in step (c) is carried out for a time ranging from about 40 to 50 hours. In a preferred embodiment, the time is 48 hours.

In an embodiment of the present invention, the drying in step (e) is carried out for a time ranging from about 10 to 15 hours.

Further, the present invention provides an electrode comprising a metal organic framework (MOF) comprising a Calgary Framework (Calf-20), wherein the MOF is obtained from the said process.

Further, the present invention provides a process for preparing an electrode, wherein the process comprises:

a) preparing a slurry by mixing an activated material, activated carbon, and a binder in a solvent to obtain a mixture,
 b) grinding the mixture to obtain a homogenous slurry, and
 c) coating the slurry uniformly on a substrate followed by drying at a temperature ranging from 50° C.-100° C. to obtain the electrode.

In an embodiment of the present invention, the slurry is deposited on the substrate in an amount ranging from 1-5 mg on 1 cm² area of nickel foam.

In an embodiment of the present invention, the binder is selected from Polyvinylidene fluoride (PVDF). In a preferred embodiment, the binder is PVDF. Other binders such as PTFE and Nafion can also be used for making the slurry.

In an embodiment of the present invention, the solvent is selected from N-Methyl-2-pyrrolidone (NMP). In a preferred embodiment, the solvent is NMP. NMP is used as primary solvent. However, DMSO or other organic solvents may also be used.

In an embodiment of the present invention, the substrate is selected from nickel foam. In a preferred embodiment, the substrate is Nickel foam. Other substrates such as FTO glass, carbon cloth, glassy carbon, and copper foam may also be utilized for the electrochemical testing of CALF-20.

Again, the present invention provides a 3-electrode configuration system comprising an electrode, a counter electrode, a reference electrode, and an electrolyte, wherein the electrode comprises a flexible metal organic framework (MOF) coated nickel foam of the present invention, and
 wherein the concentration of the electrolyte is in the range of about 1M to 6M.

In a preferred embodiment, the concentration of the electrolyte is 3M.

The present invention thus provides a new flexible metal-organic framework (MOF) named Calf-20 synthesized using solvothermal method and is applied to variants of electrodes for supercapacitors. CV and GCD results afford that Calf-20 obtained from the process of the present invention has the highest specific capacitance (Cs) of 567 $Fg^{-1}$ at 1 $mVs^{-1}$ and 109 $Fg^{-1}$ at 1 $Ag^{-1}$ in 3M KOH which is due to the better ion diffusion route, improved charge transfer rate, ease of surface access and surface utilization. Moreover, an 82.5% capacitance retention after 20,000 cycles is observed at a current density of 20 $Ag^{-1}$ depicting the cyclable capacity of Calf-20 electrode. Thus, the Calf-20 obtained from the process of the present invention ensures higher energy delivery applications and is used in higher efficiency scalable supercapacitors.

EXAMPLES

Although the content of the present invention is further specifically explained using Examples, the present invention is not limited to the following Examples as long as the gist of the present invention is not exceeded. Values of various manufacturing conditions and evaluation results in the following Examples mean preferable values of an upper limit or a lower limit in the embodiments of the present invention, and a preferable range may be a range defined by a combination of the above-described upper limit or the above-described lower limit and the values of the following Examples or a combination of the values of Examples.

Example 1: Synthesis of Calf-20

For the preparation of Calf-20, the precursors zinc oxalate hydrate ($Zn(C_2H_4)\cdot xH_2O$) (>99.99% purity, Sigma Aldrich), 1,2,4-triazole ($H_3C_2N_3$) (>99.0% purity, Sigma Aldrich), methanol (CH3OH) (≥99.9% purity, Sigma Aldrich) were used. For electrochemical testing, N-Methyl-2-pyrrolidone (NMP) (99.5% purity, Sigma-Aldrich), Activated carbon (99.99% purity, Sigma Aldrich) and Polyvinylidene fluoride (PVDF)($CH_2CF_2)_n$, Sigma Aldrich) were used for making electrodes on porous nickel foam. All the chemicals are used in their original form without any further purification.

To obtain Calf-20 powder, 3.30 g zinc oxalate was initially dissolved in a 20 ml solvent (methanol) under magnetic stirring. After 5 minutes, 2.50 g of 1, 2, 4-triazole was added to the above solution under continuous stirring. The obtained solution was stirred to obtain a homogeneous suspension which was then transferred to 50 ml Teflon autoclave and heated to 180° C. for 48 hours. The autoclave was allowed to cool down to room temperature, naturally. The obtained precipitates were washed several times with methanol to remove any unreacted species. The final product was obtained by drying the washed content in an oven at 80° C. for 12 hours.

Example 2: Electrode Preparation and Electrochemical Testing

Electrode Preparation

A slurry was prepared by using Calf-20 as active material, activated carbon, and PVDF binder in a ratio 8:1.5:0.5 and mixed in NMP. All the contents were grinded well in an agate mortar and pestle to obtain a homogenous slurry. Further, nickel foam was used as a substrate and cut in 1×2 $cm^2$ dimensions. The prepared slurry was coated uniformly on 1×1 $cm^2$ area of nickel foam by using spatula to obtain the electrode. The prepared electrode was dried in an oven at 80° C. for half an hour before subjecting it to further electrochemical testing. Weight of bare nickel foam was measured before and after the deposition of slurry to obtain the corresponding mass loading which was kept in a range of 2-3 mg.

Three-Electrode Setup for Evaluation of Supercapacitor Properties of Calf-20

For the preparation of the three-electrode setup, an electrochemical workstation potentio-stat/Galvano-stat (Corrtest, CS350M in COM4) was used. Cyclic voltammetry (CV), galvanostatic charge/discharge (GCD), and electrochemical impedance spectroscopy (EIS) were initially carried out in a potential window of −0.15 to 0.45 ($\Delta V$=0.6 V). 3-electrode configuration was achieved using Calf-20 coated nickel foam as working electrode, platinum mesh as counter electrode and Ag/AgCl (4M KOH) as reference electrode. The testing was performed using different electrolyte solutions including 1M, 3M, and 6M KOH. CV investigations were conducted in a range of 5 to 100 mVs⁻¹ scan rate while GCD curves were obtained in the range of 1 to 5 Ag⁻¹ and EIS parameters were kept between 0.01 Hz to 1000 kHz frequency. Final stability testing was conducted for 10, 000 cycles in 3M KOH electrolyte solution at 20 Ag⁻¹. Measurement of specific capacitance (Cs) from cyclic voltammetry and galvanostatic charge/discharge has been carried out using the following equations, respectively:

$$C_s = \frac{\int Idv}{m \times \Delta V \times v} \tag{1}$$

-continued $$C_s = \frac{I \times t}{m \times \Delta V} \tag{2}$$

Where, I stand for current, m is mass loading, $\Delta V$ is voltage window, v is the scan rate, and t is discharging time.

Characterization—The structure of Calf-20 was further confirmed using powder X-ray diffraction (XRD) with a Bruker Advance D8 diffractometer, Cu Kα radiation, λ=0.154 nm. To analyse the morphological features of the prepared Calf-20, the Hitachi SU8020 SEM (scanning electron microscopy) was used. Additionally, to determine the functional groups that are present in Calf-20, Fourier transform infrared (FTIR-4700), JASCO was employed. Moreover, Raman spectrometry (HORIBA spectrometer) has been used at a wavelength of 532 nm.

Structural and Morphological Characterizations

Figure 1:
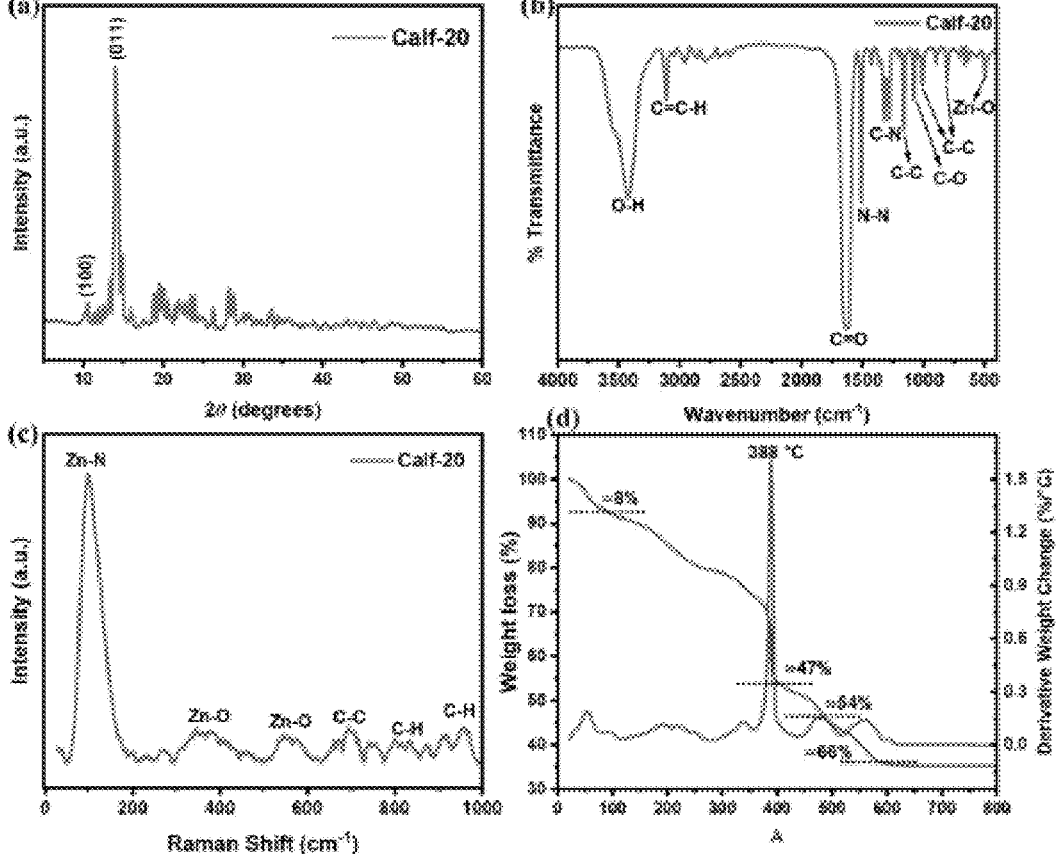
FIG. 1 illustrates (a) X-ray diffraction pattern, (b) FTIR spectra, and (c) Raman Spectra, and (d) Thermogravimetric Analysis curves of Calf-20

FIG. 1($a$) presents the XRD pattern of prepared Calf-20 material that are matched exactly with previously reported literature. The sharp peaks observed at 10.5° and 14.14° corresponds to the planes (100) and (001) respectively and are associated with the carbonaceous framework. Further, the smaller distributed peaks in the higher angle regions depict the disordered and mix-phased composition. Such patterns are observed often for porous materials or layered structures, thus presenting Calf-20 properties as typical metal organic frameworks that predict the usage of this material in energy storage applications. The layered structure comprised of 1,2,4-triazole ring bridged with zinc ions while the interlayers joining is based on oxalate ligands. Moreover, the zinc atom is connected to three nitrogen atoms from two triazole ligands and with two oxygen atoms of chelating oxalate groups. This phenomenon repeated multiple times to form a layered structure of Calf-20.

To analyse the functional groups, present in Calf-20 structure, FTIR was performed whose spectra is shown in FIG. 1($b$). The peak around 500 cm⁻¹ indicates the Zn—O bond originating from zinc oxalate precursor. The peaks at 796, 1015, and 1156 cm⁻¹ correspond to C—C bond while the strongest peak at 1638 cm⁻¹ belongs to C=O. Regarding the nitrogen functional groups from triazole group, the peaks at 1310 and 1507 cm⁻¹ represent the C—N and N—N bonding respectively. The aromatic triazole hydrogen C=C—H bond was found at 3111 cm⁻¹. Further, the peak at 3400 cm⁻¹ was associated with the —OH bond present in zinc oxalate. These peaks were in consistent with the Calf-20 precursors used.

In addition, Raman spectroscopy of Calf-20 was out confirming the bonds present in the structure using bond vibration modes. The corresponding Raman spectra is shown in FIG. 1($c$) illustrating the existence of intense bands of Zn—N and Zn—O at 110, 350, and 550 cm⁻¹. Moreover, there are bands of C—C and C—H in the range of 700 to 1000 cm⁻¹ indicating the presence of these bonds in the Calf-20 structure. Thus, this analysis validated that for Calf-20 the major bonds are Zn—N and Zn—O and the triazole and oxalate fractions serve as supporting frameworks. So, there is evidence of structural asymmetry appearing from splitting of Zn—O vibrations which could imply distortions or multiple coordination modes present in Calf-20.

The thermogravimetric analysis (TGA) of CALF-20 showed three primary weight reduction stages corresponding to multiple decomposition processes. During the temperature range between 50-100° C. the sample lost 8% weight as physically bound water released from its surface.

During the 100-380° C. range the framework lost its weight gradually by 47% which can be linked to thermal breakdown of organic ligands in the structure including triazole ring and oxalate framework. Structural failure of the CALF-20 network happens at temperatures above 380° C. to 490° C. where 54% weight loss was observed. The porous framework of the material disintegrated in this specific temperature range. Moreover, it was noted that at temperatures from 350° C. to 800° C. the material showed small loss in weight as it kept 35% of its initial weight. The test data showed that CALF-20 maintained its structure until 350° C. making it suitable for supercapacitor applications.

Figure 2:
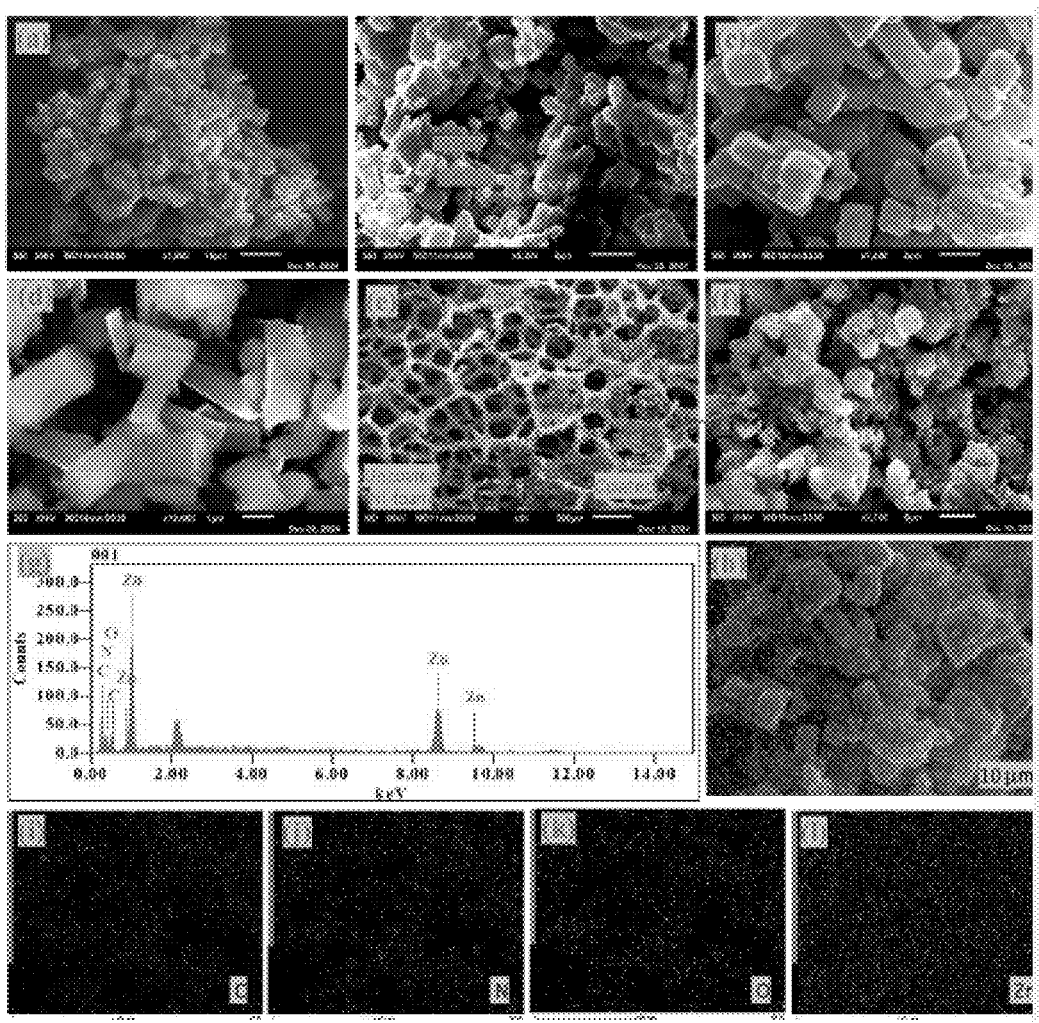
FIG. 2 illustrates SEM images of Calf-20 at (a) 10 μm, (b) 5 μm, (c) 2 μm, (d) 1 μm, (e) electrode morphology at 100 μm, (f) Calf-20 coating at 5 μm, (g) elemental mapping, (h-l) elemental distribution elements in the structure containing C. N, O, and Zn.

SEM-SEM micrographs were obtained to analyze the morphological features of Calf-20. FIG. 2(a) depicted the rectangular morphology of single particle and an overall distribution of different microsize particles in a range of 1 to 3 μm. Moving towards higher magnification that was 5 μm, an average particle size of the slab was calculated to be 2.62 μm length and 1.48 μm width. To analyse further, FIG. 2(c, d) was recorded and presented a clear slab-like and morphology with the distribution of small interconnected irregular shaped particles forming an overall porous structure. The distinct morphology of Calf-20 was attributed to formation of network in methanol solvent only without using methanol/DI water mixture and using the smaller solvent quantity, like angular particles, platelet morphology, spherical morphology, and rod-like structure depending on the solvent type (methanol, DI water, or methanol/DI water mixtures). FIG. 2(e) represents the coating of Calf-20 on nickel foam where the boundary region separated the coated and uncoated region of substrate. It depicted that the slurry was incorporated in the pores of Ni-foam for efficient electrochemical testing. In the coated side of Ni-foam, the morphology at high magnification is shown in FIG. 2(f), presenting the slab-like structure persistent in the electrode slurry as well. Moreover, the elemental percentage of elements in Calf-20 structure is shown in Table 1 and FIG. 2(g) indicating the dominating percentage of carbon and Zn in the material as depicted by the composition of precursors. This well-distributed morphology was predicted to be effective for energy storage applications. Furthermore, the distribution of major elements in Calf-20 is shown in FIG. 2(h-l) at 10 μm. illustrating the uniform distribution of metallic centres i.e., Zn with heterocyclic network of C, N, and O, also confirming the elemental percentage in Table 1.

TABLE 1

Percentage of elements present in Calf-20 measured using SEM.

| Element | Mass % | Atom % |
|---|---|---|
| C | 26.24 | 42.53 |
| N | 25.38 | 35.28 |
| O | 8.46 | 10.30 |
| Zn | 39.92 | 11.89 |

Electrochemical Testing-
Cyclic voltammetry (CV)

Figure 3:
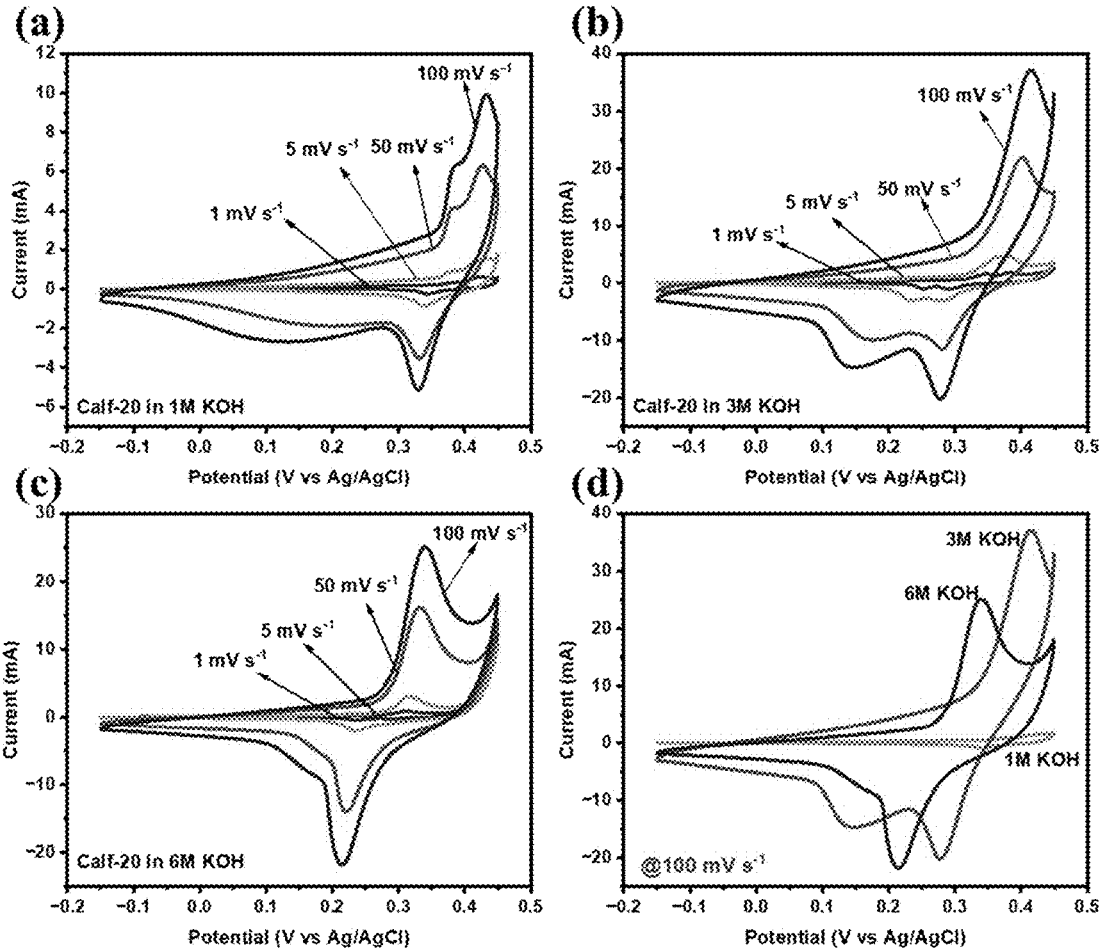
FIG. 3 illustrates Cyclic voltammograms of Calf-20 in (a) 1M KOH, (b) 3M KOH, (c) 6M KOH, and (d) comparison of CV curves at 100 mVs$^{-1}$ for three electrolytes.

To evaluate the redox properties of Calf-20, cyclic voltammograms were obtained at increasing scan rates that were 1, 5, 50, and 100 mV s$^{-1}$ using different concentrations of aqueous potassium hydroxide electrolytes (1M, 3M and 6M KOH) in the potential window of −0.15 to 0.45 (ΔV=0.6 V). FIG. 3(a-c) shows the cyclic voltammograms of Calf-20 depicting the pseudocapacitive behavior in all the electrolytic conditions. This pseudocapacitive behavior was attributed to the presence of $Zn^{+2}$ ions that result in redox reactions with the alkaline aqueous electrolyte ($OH^{-1}$ ions). This behavior has been reported previously in different studies for materials involving zinc ions such as ZIF-8 and $ZnCo_2S_4$. Not only for the zinc based materials, but also for 1, 2, 4 triazole, the pseudocapacitive behavior was observed in various studies. Interestingly, it was noted that the redox peaks were present in all the electrolyte concentrations, however, there was a shift in the peak position and CV curve shapes owing to varying KOH concentrations impacting the ion diffusion rates and charge transfer kinetics. Moreover, the variation in zinc ions oxidation resulted in this changed behavior. In the Calf-20 CV loops of 1M KOH in FIG. 3(a), there were two oxidation peaks where the peak at 0.42 V was prominent while a minor peak was observed at 0.36 V, and a reduction peak at 0.33 V at 100 mV s$^{-1}$. Considering the CV loops in 3M and 6M KOH as presented in FIG. 3(b, c), the oxidation peaks were observed at 0.4V and 0.32V, respectively. However, there were two reduction peaks for 3M KOH concentration at 0.28V and 0.11V and single reduction peak in 6M KOH at 0.21V. The shift of redox peaks towards lower potential values indicated that the oxidation and reduction reactions can be achieved at low potentials with higher KOH molarities presenting a sufficient $OH^{-1}$ ions concentration. The overall shift in peak positions indicated the different redox reactions and their extent based on oxidation states of zinc and triazole reactions with electrolyte. FIG. 3(d) showed the comparison of CV curves in all the electrolyte concentrations at 100 mV s$^{-1}$ where Calf-20 in 3M KOH has the broader curve area and highest current (mA) achieved. It depicted the optimum concentration of 3M KOH electrolyte for the excellent performance of Calf-20 for supercapacitor applications. It was reflected by the highest specific capacitance of 567 F g$^{-1}$ at 1 mV s$^{-1}$ for Calf-20 in 3M KOH concentration while the specific capacitance in other electrolyte concentrations and scan rates are listed in Table 2. This highest specific capacitance in 3M KOH was attributed to the optimum balance and ion transfer between the electrolyte and electrode interface which is lower in case of 1M KOH due to lack of sufficient $OH^{-1}$ ions. However, in case of 6M KOH, excessive $K^{+1}$ and $OH^{-1}$ resulted in increased solution viscosity that impedes the ion mobility and lowers diffusion rates. These phenomena were also observed by various studies on varying alkaline concentrations. Following are the possible reactions for the redox phenomena of Calf-20:

$$Zn+4OH^- \rightarrow Zn(OH)_4^{-2}+2e^- \tag{3}$$

$$Zn+C_2H_3N_3+OH^- \rightarrow Zn(C_2H_3N_3)(OH)+e^- \tag{4}$$

$$2H_2O+2e^- \rightarrow H^8+2OH^- \tag{5}$$

TABLE 2

Specific Capacitance of Calf-20 from CV
and GCD at different scan rates and current
densities in 1M, 3M and 6M KOH electrolytes

| | Specific capacitance of Calf-20 | | | | | | | | |
|---|---|---|---|---|---|---|---|---|---|
| | Scan rates (mV s$^{-1}$) | | | | Current Density (A g$^{-1}$) | | | | |
| Electrolyte | 1 | 5 | 50 | 100 | 1 | 2 | 3 | 4 | 5 |
| 1M KOH | 138 | 93 | 46 | 35 | 63 | 58 | 52 | 47 | 44 |
| 3M KOH | 567 | 353 | 162 | 124 | 109 | 97 | 92 | 80 | 67 |
| 6M KOH | 304 | 201 | 114 | 94 | 92 | 87 | 69 | 64 | 62 |

GCD (galvanostatic charge/discharge)—Further, to analyse the charge/discharge rates, GCD curves were recorded for Calf-20 in 1M, 3M, and 6M KOH electrolyte. The corresponding GCD profile curves are shown in FIG. 4(a-c) while the comparison at 1 A g⁻¹ has been shown in FIG. 4(d). Comparing the discharge time, Calf-20 in 3M KOH presented the highest specific capacitance value of 109 Fg⁻¹ as calculated using Equation 2 while in 1M and 6M KOH, the specific capacitance value is 63 and 92 Fg⁻¹ respectively. The specific capacitance at other current densities is listed in Table 2. The trend of specific capacitance was same as previously observed in the cyclic voltammogram Cs values with the similar reason of insufficient ions availability in 1M KOH aqueous electrolyte and excessive ions increasing the solution viscosity that impedes ionic diffusion in 6M KOH. An optimum amount of ions availability, diffusion, ions transport, and materials compatibility attributed to 3M KOH electrolyte. Moreover, the obtained specific capacitance of Calf-20 was comparable to the other zinc-based materials. For example, a publication reported a specific capacitance of 73 Fg⁻¹ at 1 Ag⁻¹ current density for pure ZIF-8 that is a zinc-based MOF material. Further, another publication, tested the ZIF-8 cubic crystals made using solvothermal process for supercapacitor applications and found that it delivered 35.38 Fg⁻¹ at current density of 1 Ag⁻¹ in 6M KOH aqueous electrolyte. Moreover, another publication, reported ZIF-8 composites with polyaniline as electrode materials for supercapacitors, however, pure ZIF-8 composites showed a specific capacitance of 27.4 Fg⁻¹ at 1 A g⁻¹ current density in 1M KOH. Finally, a previous study reported a higher specific capacitance of even 185 Fg⁻¹ at 5 mVs⁻¹ and 178 Fg⁻¹ at 1 Ag⁻¹ in 2M KOH. So, these studies revealed that Calf-20 outperformed the corresponding ZIF-8 nanocomposite electrode materials in many cases and different molarities of KOH were employed for electrochemical testing. Thus, Calf-20 can be used as an efficient electrode material for supercapacitor applications. The comparison of specific capacitance of Calf-20 and other zinc-based electrode materials have been presented in Table 3.

TABLE 3

Comparison of Calf-20 with other Zinc-based electrode material

| | | Specific capacitance | |
|---|---|---|---|
| Electrodes | Electrolyte | Scan rate | Current Density |
| ZIF-8 | 6M KOH | 65 Fg⁻¹ (5 mVs⁻¹) | 73 F g⁻¹ (1 Ag⁻¹) |
| Cubic ZIF-8 | 6M KOH | 42.22 Fg⁻¹ (10 mVs⁻¹) | 35.38 Fg⁻¹ (0.5 Ag⁻¹) |
| Dodecahedral ZIF-8 | 1M KOH | — | 27.4 Fg⁻¹ (1 Ag⁻¹) |
| ZIF-8 ZnO/ ZIF-8 | 0.5M Na₂SO₄ | 763.7 F g⁻¹ (10 mVs⁻¹) | 500 Fg⁻¹ (0.5 Ag⁻¹) |
| ZIF-8 | 2M KOH | 185 F g⁻¹ (10 mVs⁻¹) | 178 F g⁻¹ (1 Ag⁻¹) |
| ZnO nanowire | 1M H₂SO₄ | — | 140 F g⁻¹ 1 (14 Ag⁻¹) |
| ZnO | 6M KOH | — | 194 F g⁻¹ (20 Ag⁻¹) |
| ZnO tartrate | 6M KOH | — | 173 F g⁻¹ (20 Ag⁻¹) |
| Calf-20 | 3M KOH | 567 F g⁻¹ (1 mVs⁻¹) | 109 F g⁻¹ (1 Ag⁻¹) |

Impact of Increasing Scan Rate and Current Density—Beyond comparing the CV and GCD curves, the impact of scan rate and current density on these techniques was also analyzed. The variation in specific capacitance with increasing scan rate and current density is presented in FIG. 5(a, b). With increasing scan rate and current density, the specific capacitance values decreased. This decrease was attributed to the faster scan rates limiting the accessibility of deeper pores of electrode materials as less time is available for the electrolyte ions to move and fully utilize the Calf-20 pores. The mismatch between the electrode/electrolyte interactions and the applied current density time was the reason for this lowered capacitance. Moreover, as Calf-20 was showing pseudocapacitive behaviour, the higher current densities or scan rates did not allow enough time for the pseudocapacitive reactions to occur and resulted in higher specific capacitance.

Capacitive and Diffusive Contribution—To study the reaction kinetics mechanism, CV curves of Calf-20 at different scan rates were further analyzed in terms of finding diffusive and capacitive contributions. For this purpose, Dunn's method was followed that have been reported as best to be applied for pseudocapacitive CV curves. Following equation have been used for Dunn's method:

$$i = k_1 v + k_2 v^{1/2} \qquad (6)$$

Where, i is the peak current at 1, 5, 50 and 100 mV s⁻¹, v is scanning rate, $k_1$ is the slope of line joining the peak currents, and $k_2$ is the intercept of that line. Dividing the equation (6) with $v^{1/2}$ on both sides, following equation has been obtained:

$$\frac{i}{v^{1/2}} = k_1 v^{1/2} + k_2 \qquad (7)$$

The first term in Equation (6) depicts the capacitive contribution while the second term corresponds to diffusive contributions. For Calf-20, the diffusive and capacitive contributions was obtained in 1M, 3M and 6M KOH and presented in FIG. 6(a-c). The specific capacitance of Calf-20 depends on the balance of ion accessibility, diffusion and the electrode/electrolyte interface while working in the different concentrations of KOH. The highest specific capacitance obtained from 3M KOH demonstrated the prevalence of the enhanced electrochemical reactions due to active ion concentration while minimizing the impacts of diffusion or charge transfer resistance. In this concentration, the diffusion-controlled contribution depicted by the blue segment and the capacitive contribution depicted by the green segment are mostly balanced to give the material the maximum surface area for Faradaic and non-Faradaic processes.

However, the specific capacitance at 6M KOH was lower than that at 1M KOH because ion overcrowding near the electrode surface reduced their mobility that hindered diffusion-controlled processes. This was evidenced in increased diffusion-controlled contributions over that of capacitive contribution, indicating the electrolyte content has increased beyond the optimal value. Moreover, the highest diffusive contribution was observed in 1M KOH but due to insufficient ions to occupy all the accessible sites on the electrode surface, specific capacitance was lowest. Thus, though the capacitive contribution was high, the number of ions per unit volume in the electrolyte was lower that could not deliver high charge storage hence lower specific capacitance.

Electrochemical Active Surface Area—Electrochemical active surface area (ECSA) is one of the most widely used techniques for determining the surface area within electrode material that is taking part in the overall electrochemical reactions. ECSA is calculated using cyclic voltammograms of Calf-20 in all electrolytic concentrations and different scan rates. For ECSA calculations, following equation has been used:

$$ECSA = \frac{C_{dl}}{C_s} \qquad (8)$$

Where, $C_{dl}$ is the double layer capacitance that is calculated at open circuit potential using the difference of anodic and cathodic currents and then taking slope of scan rate versus current density (mA cm$^{-2}$) as shown in FIG. 5(d). While Cs is the specific capacitance that is based on type of electrolyte either acidic, basic or neutral. In this case, Cs value was taken to be 0.040 cm$^2$ as reported in the literature for basic electrolytes. The calculated ECSA for Calf-20 in all the electrolytes is displayed in Table 4. The high specific capacitance of Calf-20 electrodes in 3M KOH was well attributed to its maximum ECSA for the same electrolyte concentration because ECSA marks the actual surface area for charge storage. Also, 3M KOH was found to be most appropriate because the concentration of ions was such that electrolyte ions intervened in pores and along the surface of electrodes without crowding or having restricted ion mobility. This helped to achieve better utilization of the available active sites for both ion layer formation and pseudocapacitive processes. On the other hand, in 6M KOH, the decrease in ECSA was because of ion overcrowding and decrease in diffusion of active sites in the electrode interior in addition to the difficult access to the internal surface area of the electrode. As a result, with 3M KOH electrolyte, the material of Calf-20 was in the best state where its surface was fully utilized, and the capacitance was at its highest.

TABLE 4

| ECSA calculations for Calf-20 in different electrolytes | | | |
| --- | --- | --- | --- |
| Electrolyte | Slope/Cdl (mF) | Cs (mF cm$^{-2}$) | Calf-20 ECSA (cm$^2$) |
| 1M KOH | 0.00663 | 0.04 | 0.165 |
| 3M KOH | 0.01007 | 0.04 | 0.252 |
| 6M KOH | 0.00785 | 0.04 | 0.196 |

EIS (electrochemical impedance spectroscopy)—EIS was performed to further examine the impedance mechanism charge transfer kinetics of prepared electrodes of Calf-20. FIG. 5(c) shows the Nquist plots of Calf-20 electrodes in 1M, 3M, and 6M KOH solutions. The Nquist plot here comprised of solution resistance and charge transfer resistance. The calculated solution resistances (Rs) for 1M, 3M, 6M KOH electrolytes with Calf-20 electrodes were 0.83, 0.41, and 0.56Ω. It further confirmed that 3M KOH electrolyte provided minimum solution resistance to the movement and transport of charge while 1M KOH electrolyte showed the highest Rs value predicting lower specific capacitance in this medium. Moreover, the curve curvature is smallest in the case of 3M KOH electrolyte as compared to others, reflecting the best charge transfer efficiency and hence, the specific capacitance.

Cyclic Stability—To analyze the specific capacitance retention of Calf-20 in best performing electrolyte (3M KOH), 20,000 cycles were ran in the GCD technique. The capacitance retention from this data is shown in FIG. 7(a) where after 20,000 cycles at 20 A g$^{-1}$, 82.5% of the original capacitance value was retained. Further, to investigate the morphological attributes and changes of the prepared Calf-20 electrode, SEM analysis of coated and spent nickel foam electrode was conducted. FIG. 2(e) and FIG. 7(a) inset, demonstrate the SEM image comparison of freshly prepared Calf-20 electrode and spent electrode, respectively. Comparing these two SEM images, after 20,000 cycles, the spreading of ink on the porous surface of nickel foam became more homogeneous which was attributed to the formation of some new compounds or deposition of KOH electrolyte precipitates over the period. Moreover, there was higher distortion in the nickel foam structure at the end of experiment revealing the changes in pore structure of nickel foam as well, thus affecting the overall specific capacitance of the electrode. Furthermore, the SEM images were recorded at higher magnifications of 5 μm to analyse the morphological features. FIG. 7(c, d) shows the changes in the morphology of the CALF-20 electrode material before and after electrochemical testing. FIG. 7(c) presents the morphology of the CALF-20 electrode before the electrochemical investigation reflects uniform and well-defined microstructure. The surface is also composed of compact particles with sharp edges and interconnected porosity which is one of the reasons behind better ion transport and access to the active sites. This structure is particularly suitable for supercapacitors allowing bulk capacitance retention and stable electrochemical activity.

On the other hand, FIG. 7(d) depicts that the previously homogeneous and ordered structure was characterized by a rough and shattered morphology with irregularly shaped particles and the loss of porosity. This degradation was attributed to mechanical stress caused by the repeated ion insertion/extraction through cycling, leading to volume changes, internal strain and finally particle detachment. Furthermore, some chemical reactions due to the electrolyte, which may similarly include oxidation or dissolution to the framework of CALF-20 could destabilize the structure. The structure of the spent electrode, therefore, has fewer pores to which charged species can access, fewer active sites at which reactions can occur and a less porous structure through which ions can move and overall poor electrochemical performance.

While the invention has been described in connection with specific embodiments and examples, it is to be understood that the scope of the invention is not limited thereto. Various modifications, alterations, and substitutions may be made without departing from the spirit and scope of the present invention as defined by the appended claims. The embodiments described herein are intended to illustrate the principles of the invention and are not meant to be exhaustive or to limit the invention to the precise form disclosed.

The invention claimed is:

1. An electrode comprising an active material, an activated carbon, a binder, and a substrate, wherein the active material is a metal organic framework (MOF) comprising a Calgary Framework (Calf-20), said CALF-20 being present as discrete particles having a particle size distribution of 0.5 to 5 μm and maintaining a porous structure up to 350° C., and wherein the electrode is configured for use in a supercapacitor as an electrode.

2. The electrode as claimed in claim 1, wherein the active material, the activated carbon, and the binder are present in a weight ratio of A:B:C, wherein:

A is 6 to 10;

B is 0.5 to 3; and

C is 0.1 to 1.

3. The electrode as claimed in claim 1, wherein the binder is Polyvinylidene fluoride (PVDF), wherein this binder is combined for the first time with the electrode.

4. The electrode as claimed in claim 1, wherein the substrate is Nickel foam on which, for the first time, the electrode is coated.

5. The electrode as claimed in claim 1, wherein the electrode exhibits a capacitance retention of 80% to 90% after 15,000 to 25,000 charge-discharge cycles at a current density of 15 to 25 A·g$^{-1}$.

6. The electrode as claimed in claim 1, wherein the CALF-20MOF is water-stable and exhibits a BET surface area of at least 400 m$^2$/g.

7. The electrode as claimed in claim 1, wherein the binder is polytetrafluoroethylene (PTFE) or Nafion.

8. A 3-electrode configuration system comprising an electrode according to claim 1, a counter electrode, a reference electrode, and an electrolyte, wherein the concentration of the aqueous KOH electrolyte is in the range of about 1M to 6M.

\* \* \* \* \*